J. V. B. CARTER & J. DWYER.
Base-Burning Stoves for Heating and Cooking.
No. 5,926. Reissued June 23, 1874.
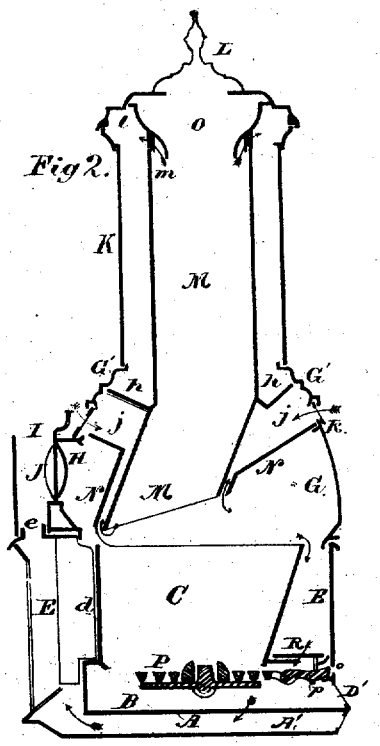
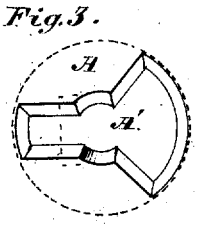
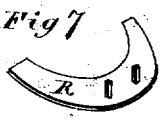
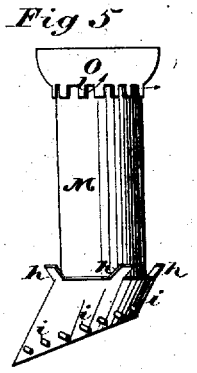
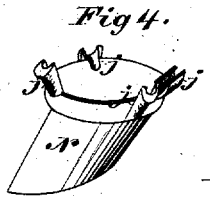
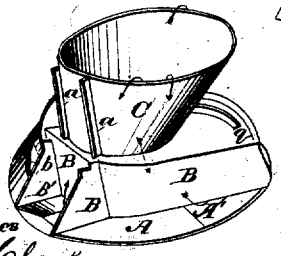
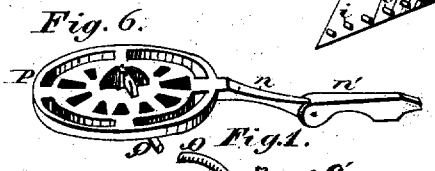
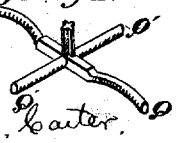
Witnesses
H. C. Clark
R. N. Dyer.
Inventors.
John V. B. Carter.
James Dwyer.
Rd Dyer. Beddoe & Co
Attys.
AM. PHOTO-LITHOGRAPHIC Co. N.Y. (OSBORNE'S PROCESS.)

UNITED STATES PATENT OFFICE.

JOHN V. B. CARTER AND JAMES DWYER, OF DETROIT, MICHIGAN, ASSIGNORS TO THE DETROIT STOVE WORKS.

IMPROVEMENT IN BASE-BURNING STOVES FOR HEATING AND COOKING.

Specification forming part of Letters Patent No. 131,936, dated October 8, 1872; reissue No. 5,926, dated June 23, 1874; application filed December 16, 1873.

DIVISION A.

*To all whom it may concern:*

Be it known that we, JOHN V. B. CARTER, and JAMES DWYER, of Detroit, in the county of Wayne and State of Michigan, have invented an Improvement in Base-Burning Stoves, of which the following is a specification:

The nature of our invention relates to certain improvements in that class of heating-stoves in which anthracite coal is used as fuel, and are known as "base-heaters."

The objects of our invention are, first, to secure perfect combustion of the fuel and gases; second, to make the whole surface of the stove, and especially that of the base, available as radiating-surface; third, to consume any gases generating in the coal contained in the magazine by drawing the said gases into the combustion-chamber of the stove; and, fourth, to secure ease and cleanliness in manipulation, and a perfect control of the rate of combustion of the fuel.

The invention consists in the combination and arrangement of the principal operative parts, constructed and operated substantially as hereinafter described and set forth.

Figure 1 is a perspective view of the spider which supports the grate; Fig. 2 is a vertical section of the same without the oven; Fig. 3 is a plan or top view of the base-plate; Fig. 4 is a perspective view of the combustion-sleeve; Fig. 5 is a side elevation of the magazine with the sleeve, Fig. 4, removed; Fig. 6 is a perspective view of the grate and its jointed shaker-arm; Fig. 7 is a perspective view of the ash and dust plate inverted to show the shaker-studs; Fig. 8 is a perspective view of the fire-pot from the rear side, with the rear-side wall of the base-chamber cut away to show the course of the heated currents through the base-flue.

In the drawing, A represents a circular base-plate cast with a depression, A′, Fig. 3, to form a base chamber and flue. B is an ash-box resting on the base-plate, covering that part of the base chamber and flue inclosed in the dotted lines in Fig. 3. The space above the mouth of the base-flue, at its rear end, is inclosed by projecting sides of the ash-box, as at B′, Fig. 8. On top of the ash-box is erected the fire-pot C, cast with the vertical ribs *a a* at the back. D is the base-ring with an opening at the front closed by the ash-drawer D′, through which opening access is had to the ash-pit. There is also an opening at the back part, at each side of which is a rib, *b*. E is the fire-pot section of the stove-cylinder, and sleeved over the base-ring with a vertical opening at the back, with a flange, *c*, at each side projecting outwardly, and another, *d*, projecting inwardly, and coming between the ribs *a a* of the fire-pot from the back flue. The lower ends of the flanges *c* engage with the ribs *b* of the base-ring to form a joint, which may be cemented in the usual manner. *e* is the pipe-collar at the top of the back flue, which may have its back closed by a plain plate, or by attaching an oven. In either case the back part of the fire-pot forms the front wall of the back flue. G is the mica section or combustion-chamber, perforated with window-like openings glazed with sheet mica. At the back of this section, (which rests on the fire-pot section,) there is a direct draft-flue, H, leading into the smoke-pipe I, which is mounted on the collar of the back flue. The flue H is provided with a damper, J, to cut off the direct draft when desired. K is the magazine-section, surmounted by a suitable top, and which is provided with a swinging cover, L. M is the magazine, whose lower end is inclined diagonally toward the back part of the fire-pot, and whose mouth is cut away obliquely, as seen in Figs. 2 and 5, to cause the coal to bank up high from the center of the fire-pot toward the front, and thus to "light up" the stove to better advantage, and consequently make the room more cheerful.

At the intersection of the angles of the magazine it is provided with several radial plates, *h*, inclined upward, and are bolted at their ends to the ring G′ at the top of the mica section. Around the mouth of the magazine is a series of projecting studs, *i*, Fig. 5, and over that part is slipped a combustion-sleeve, N, provided with radical semi-cylindrical air-ducts *j*, at the top, which, lying up against the plates *h* when the sleeve is bolted to place, form air-passages through apertures in the ring G′ to the mouth of the magazine. The ring G′ is provided with an annular air-register, *k*, through which air may enter, pass down the air-ducts *j*, thence between the sleeve and the magazine into the combustion-chamber, where, mingling with the gases of the incandescent fuel, it is with them ignited at the moment it issues from the narrow annular space at the mouth of the magazine. The ignition takes place early in the mingling of the oxygen with the gases, because the former is heated to a high degree in its passage through the sleeve, and it also preserves the metal from the destructive effect of the great heat arising from the fuel by keeping the metal walls of the magazine and sleeve at a lower temperature than they would otherwise be subjected to. The hopper O at the top of the reservoir at its upper edge fits snugly against the under side of the top, or may be jointed thereto with cement. It is ogee-shaped in cross-section, and is cast with a row of pendent studs, *l*, on the outer side, which support it on the top of the magazine, the ogee form of which makes a capacious gas-chamber, *m*, above the fuel, while the interstices between the studs allow the gases which may be evolved from the fuel in the magazine to pass out, as shown by the arrows in Figs. 2 and 5, and by the draft of the stove be drawn down into the combustion-chamber and be consumed, instead of escaping into the apartment through the joints of the cover, to the detriment of its occupants, and which is one of the principal objections urged against magazine-stoves. P is a rotary or mill grate cast with an arm, *n*, at the front edge, to which is hinged another arm, *n′*, having cored in its outer end a hooked or curved socket, shown in dotted outline in Fig. 6. The grate rests on and is pivoted to a center stud on a pair of trunnions, Q, pivoted in the ash-pit below the fire-pot in bearings cast in the side walls of the ash-pit. The trunnions are cast with a shorter pair of arms, Q′, crossing them at right angles, the whole forming a spider, which supports the grate at four points, and thus prevents it from sagging under the weight of the fuel when heated to a high degree, as such grates very frequently do. The arm *n′* of the grate rests upon a ledge segment projecting inward at the lower front edges of the section E, lying just inside the horizontal slot *o*, Fig. 2, through which the curved end of a shaker-rod may be introduced into the curved socket in the extremity of the arm, when the grate may be shaken by vibrating the shaker-rod.

To dump or tilt the grate the attendant exerts an inward thrust on the shaker, which causes the joint in the arm to fall and thus tilt the grate. To return the grate to its proper position he exerts a direct pull on the shaker-rod, which will raise the joint in the arm to its proper plane, the curve of the point of the shaker-rod preventing it from being drawn out of the curved socket by a direct pull.

Inasmuch as some dust and ashes will be carried over the edge of the fire-pot by the draft and be deposited on the top plate of the ash-box, we make use of the plate R, Fig. 7, to remove them. On the under side of this plate are two pendent studs, *p*, which are inserted through a segmental slot, *q*, Fig. 8, in the top of the ash-box, and embrace the arm *n′* of the grate. The plate is somewhat longer than the box is wide, so that each time the grate is shaken the plate will be vibrated also, and the accumulation dumped into the base-chamber A′, whence it is readily removed through a door in the base as often as may be necessary.

In kindling a fire in our stove the damper J may be turned to allow the smoke and gases to pass directly into the smoke-pipe, and the necessary air-draft be supplied through the ash-door D′. When the fuel in the fire-pot is thoroughly ignited the damper and ash-door should be closed and the draft-register *k* opened to admit a supply of air, which passes down between the sleeve and the lower end of the magazine, and is delivered in a heated thin sheet to the surface of the incandescent fuel, where it mingles with the gases of combustion and is ignited and consumed with them. The heated currents pass over the edge of the fire-pot and enter the passage A′ under the ash-pit. Passing back and up the back flue, they are arrested by the plate F′ of the oven, around which they are compelled to make the circuit before finding an exit through the smoke-pipe, as shown by the arrows in Figs. 2 and 8. If the oven be not attached to the stove the currents pass from the base-flue up the back flue and into the smoke-pipe. By revolving the annular register *k* the draft may be graduated to the requirements of the space to be warmed by the stove, or be shut off altogether and allow the fuel to smolder in the fire-pot.

As every part of the exterior of the stove is subjected to the action of the heated currents, it is evident that every part is available for heat radiating, and consequently the stove must prove a powerful as well as an economical heater. It will be noticed that the fire-pot is set as far back as possible, with its back wall vertical and its front wall inclined forward, by which we accomplish two important results. The one is that the elongation of the fire-pot at the top increases the capacity in a stove of a given diameter, while the bottom of the pot being circular the fuel in the upper part is not agitated in the rotation of the grate. The other is that, as the back of the fire-pot forms the front wall of the back flue, the air in that flue is rarefied and the draft prevented from becoming sluggish.

It is evident that the low-down oven herein described and shown can be attached to any surface-burner heating-stove having a base-chamber and a revertible draft.

What we claim as our invention, and desire to secure by Letters Patent, is—

1. In combination with the cylinder of a base-burning stove, the combustion-sleeve N, and its air-ducts *j*, draft-register K, and plate *h* of the magazine M, arranged as and for the purpose set forth.

2. The plate R, provided with the studs *p p*, in combination with the grate-arm and the slot *q* of the ash-pit top, as and for the purpose set forth.

3. The prolongations B B′ of the side walls of the ash-box, and the flanges *d d* of the section E, and an oven or a plain back plate, which, in combination with the fire-pot, forms the back-flue, substantially as described.

JOHN V. B. CARTER.
JAMES DWYER.

Witnesses:
H. F. EBERTS,
C. E. HUESTIS.